(12) United States Patent
Beyer et al.

(10) Patent No.: US 12,546,481 B2
(45) Date of Patent: Feb. 10, 2026

(54) OPTICAL WAVEGUIDE DEVICE FOR A COOKING APPLIANCE

(71) Applicant: BSH Hausgeräte GmbH, Munich (DE)

(72) Inventors: Ludwig Beyer, Kirchweidach (DE); Maxim Balzer, Rosenheim (DE); Joschka Bär, Surberg-Hufschlag (DE)

(73) Assignee: BSH Hausgeräte GmbH, Munich (DE)

( * ) Notice: Subject to any disclaimer, the term of this patent is extended or adjusted under 35 U.S.C. 154(b) by 156 days.

(21) Appl. No.: 18/578,058

(22) PCT Filed: Jul. 12, 2022

(86) PCT No.: PCT/EP2022/069369
§ 371 (c)(1),
(2) Date: Jan. 10, 2024

(87) PCT Pub. No.: WO2023/285411
PCT Pub. Date: Jan. 19, 2023

(65) Prior Publication Data
US 2024/0318827 A1    Sep. 26, 2024

(30) Foreign Application Priority Data

Jul. 12, 2021 (DE) .......................... 102021207383.2

(51) Int. Cl.
*F24C 15/00* (2006.01)
*F21V 8/00* (2006.01)

(52) U.S. Cl.
CPC .......... *F24C 15/008* (2013.01); *G02B 6/0008* (2013.01)

(58) Field of Classification Search
CPC . F24C 15/008; F24C 7/082; F21W 2131/307; H05B 6/6444; A21B 3/10; F21V 8/00
See application file for complete search history.

(56) References Cited

U.S. PATENT DOCUMENTS

| 503,720 A | 8/1893 | Hammond |
| 9,885,469 B2 | 2/2018 | Baumeister |

(Continued)

FOREIGN PATENT DOCUMENTS

| CN | 208859537 U | 5/2019 |
| DE | 102016116446 A1 | 3/2018 |

(Continued)

OTHER PUBLICATIONS

National Search Report DE 10 2021 207 383.2 dated Jan. 17, 2022.
International Search Report PCT/EP2022/069369 dated Sep. 15, 2022.

*Primary Examiner* — William J Carter
(74) *Attorney, Agent, or Firm* — Michael E. Tschupp; Andre Pallapies; Brandon G. Braun

(57) ABSTRACT

An optical waveguide device for guiding light emitted from a light source into an interior space of a household appliance includes an optical waveguide designed to emit light, introduced into the optical waveguide at a first end of the optical waveguide, to a second end of the optical waveguide. The optical waveguide has a cylindrical outer surface between the first end of the optical waveguide and the second end of the optical waveguide. A carrier is can be coupled directly or indirectly to the household appliance and includes an optical waveguide receptacle designed to receive the optical waveguide and to fix the optical waveguide axially and radially, said carrier connected to the optical waveguide by way of the outer surface, with the optical waveguide receptacle contacting the outer surface of the optical waveguide over a periphery of the optical waveguide.

17 Claims, 3 Drawing Sheets

(56) References Cited

U.S. PATENT DOCUMENTS

2011/0149551 A1\* 6/2011 Camarillo Fernandez ..................
                                                           F24C 15/02
                                                            362/311.01
2014/0242538 A1   8/2014 Senn
2021/0131671 A1\* 5/2021 Baumeister ........... F24C 15/008

FOREIGN PATENT DOCUMENTS

| DE | 102018111092 A1 | 11/2019 |
|----|-----------------|---------|
| DE | 202020101175 U1 | 5/2020  |
| DE | 202021100375 U1 | 2/2021  |
| JP | S5038221 U      | 4/1975  |
| WO | 2017059914 A1   | 4/2017  |

\* cited by examiner

OPTICAL WAVEGUIDE DEVICE FOR A COOKING APPLIANCE

CROSS-REFERENCES TO RELATED APPLICATIONS

This application is the U.S. National Stage of International Application No. PCT/EP2022/069369, filed Jul. 12, 2022, which designated the United States and has been published as International Publication No. WO 2023/285411 A1 and which claims the priority of German Patent Application, Serial No. 10 2021 207 383.2, filed Jul. 12, 2021, pursuant to 35 U.S.C. 119 (a)-(d).

The contents of International Application No. PCT/EP2022/069369 and German Patent Application, Serial No. 10 2021 207 383.2 are incorporated herein by reference in their entireties as if fully set forth herein.

TECHNICAL FIELD

The present disclosure relates to an optical waveguide device and in particular to an optical waveguide device which is provided and embodied to guide light, which is emitted from a light source outside of a cooking chamber of a cooking appliance, into the cooking chamber of a cooking appliance.

BACKGROUND OF THE INVENTION

Lighting devices for cooking appliances generally contain a light source, which emits the light provided to light the cooking chamber. Nowadays light-emitting diodes (LEDs) are used increasingly as a light source. These LEDs and associated electrical modules are referred to as lighting modules and are frequently sensitive to temperature and are not permitted to be exposed to increased temperatures. It is therefore necessary to position the light source and the associated electrical modules outside of the cooking chamber of the cooking appliance.

In order to guide the emitted light of the light source into the cooking chamber of the cooking appliance, optical waveguides, in particular glass optical waveguides, are used. The light source emits light into the optical waveguide which guides the light into the cooking chamber and at an outcouple surface of the optical waveguide emits into the cooking chamber and illuminates the same.

The optical waveguide is generally held by a carrier. This carrier provides for as good a thermal decoupling between the optical waveguide and the lighting module as possible. In addition, the carrier safeguards the optical waveguide against falling out or improper removal of the optical waveguide by a user of the cooking appliance and positions the optical waveguide relative to the cooking chamber.

Lighting devices for cooking appliances with an optical waveguide are known in a variety of forms from the prior art.

DE 20 2020 101 175 U1 discloses for instance a cooking appliance light with a carrier which embodies an illuminant receptacle, in which an illuminant in the form of a printed circuit board sits with at least one LED and has a receptacle nozzle, which is connected to the receptacle for the illuminant by way of an opening, and with a light guide rod, which sits in the receptacle nozzle and in which the light emitted by the illuminant is fed through the opening between the receptacle nozzle and the illuminant receptacle. The light guide rod is held on the carrier by means of a holding part on the carrier side and a peripheral cutout on the light guide rod side and the holding part engages in the peripheral cutout in order to fix the light guide rod to the carrier.

The lighting devices known from the prior art with the light guide rod nevertheless assume that in order to able to be fastened, the optical waveguide is processed in terms of its geometry. More precisely, the light guide rod is provided with a peripheral cutout. However, the processing of glass requires complicated manufacturing or processing methods and thus causes high component costs.

SUMMARY OF THE INVENTION

The object of the invention is therefore to provide an optical waveguide device which can be realized with standard industrial automation concepts, which provides the optical waveguide with a carrier or a holding apparatus without subsequently having to process the optical waveguide or change its geometry.

The object is achieved by an optical waveguide apparatus having the features of claim 1. Advantageous developments are the subject matter of each of the subclaims.

According to one aspect of the invention, an optical waveguide device is provided to guide light emitted from a light source into an interior space of a household appliance, in particular a cooking chamber of a cooking appliance, which has an optical waveguide and a carrier. The (glass) optical waveguide is provided and embodied to emit light, which is introduced into the optical waveguide at a first end of the optical waveguide, to a second end of the optical waveguide. The carrier has an optical waveguide receptacle which is provided and embodied to receive the optical waveguide and to fix the same axially, radially and in the peripheral direction. The optical waveguide preferably has a constant cross-section or a cylindrical, in particular circular cylindrical outer surface between the first (axial) end of the optical waveguide and the second (axial) end of the optical waveguide. The carrier is connected to the optical waveguide by way of the outer surface, wherein the optical waveguide receptacle of the carrier is preferably embodied to be rotationally symmetrical and the outer surface of the optical waveguide makes contact in particular uniformly over the periphery of the optical waveguide.

In other words, the optical waveguide device contains a cylindrical optical waveguide and a rotationally symmetrical carrier. The carrier functions as a connecting or holding element, by means of which the optical waveguide can be fixed in a lighting apparatus of the household appliance or directly on the household appliance.

The carrier is provided and embodied to fix the optical waveguide in its position, in particular radially and axially. For this purpose, the optical waveguide receptacle is embodied on the carrier, said optical waveguide receptacle receiving the optical waveguide which has a constant diameter between the first end and the second end. In terms of its diameter, the optical waveguide receptacle is matched to the constant diameter of the optical waveguide. By means of the simple geometry, in particular with a circular cylindrical outer surface or with the constant diameter, the optical waveguide is simple and cost-effective to manufacture. It is explicitly possible to dispense with subsequent, complicated processing steps, which change the geometry of the optical waveguide.

In addition to embodying the optical waveguide with a constant cross-section, embodiments are also conceivable in which the optical waveguide is free formed and/or has a conical course. In other words, in an embodiment of this type, the cross-section of the optical waveguide changes along a longitudinal extension of the optical waveguide. With an embodiment of this type, the optical waveguide preferably has a contact section in which the cross-section is embodied to be constant.

The carrier can be embodied to be rotationally symmetrical with respect to a central fiber of the optical waveguide receptacle, so that it can be mounted/attached to the optical waveguide at any angle of twist with respect to the central fiber of the optical waveguide receptacle. The symmetry of the carrier facilitates assembly of the carrier on the optical waveguide and the risk of an assembly error can be effectively reduced.

In one aspect, the carrier can be embodied as a clamping disk or at least the optical waveguide receptacle of the carrier with a plurality of clamping sections, in particular clamping lugs/serrated lugs pretensioned in a spring-elastic manner, which fix the optical waveguide in the carrier exclusively in a force-fitting manner.

In other words, the optical waveguide receptacle has a basic geometry which preferably corresponds to the geometry of a cross-section of the optical waveguide. A number of clamping lugs are embodied on a section of the carrier which is directed toward a central point of the carrier, said clamping lugs being embodied integrally with the carrier. The clamping lugs can be embodied to be circular ring segment-shaped and arranged uniformly in the peripheral direction of the carrier and at a distance from one another. Since the clamping sections or clamping lugs are distributed uniformly, the carrier makes uniform contact with the outer surface of the optical waveguide over its periphery and secures this in an axial, radial and peripheral direction in a force-fit, more precisely, frictionally-engaged manner. In an alternative embodiment, the clamping lugs preferably have a shape of an isosceles triangle, wherein the tip facing a base of the isosceles triangle is preferably oriented toward the center point of the carrier. Embodying the optical waveguide receptacle with clamping lugs ensures a simple and tool-free assembly of the carrier on the optical waveguide, since the optical waveguide only has to be shifted into the optical waveguide receptacle of the carrier.

In an alternative embodiment, the at least one clamping lug can be embodied on one side of the optical waveguide receptacle and can brace the optical waveguide against a contact surface.

The geometry of the individual clamping lugs can alternatively or in addition be adjusted to a geometry of the optical waveguide and/or to a manufacturing method of the clamping lugs.

The carrier overall or the one or more clamping lugs can be embodied from an elastic material or mounted elastically on the carrier by means of a spring element in order to be able to apply a corresponding clamping force to the optical waveguide. In an assembled state, an acute angle can be embodied between the clamping lugs and the outer surface of the optical waveguide. By pretensioning the clamping lugs in conjunction with a coefficient of friction between the lug edge of the clamping lug and the corresponding outer surface of the optical waveguide, a force-fit connection is ensured between the optical waveguide and the carrier and the carrier is fixed in the axial and radial direction against the optical waveguide. In addition, the optical waveguide can be aligned or centered centrally in the carrier by means of the elastically clamped clamping lugs.

The carrier can have an essentially round external geometry. The external geometry of the carrier can preferably have an elliptical shape.

The individual clamping lugs can be distanced from one another by means of free surfaces. The free surfaces can be embodied on a section, facing the external geometry of the carrier, with a radius.

According to another aspect, the optical waveguide receptacle of the carrier can be matched to the cross-section of the optical waveguide such that the optical waveguide can be fixed in the optical waveguide receptacle by means of a thermal press-fit connection so that the optical waveguide can be fixed in the carrier exclusively in a force-fit manner.

In other words, the optical waveguide receptacle of the carrier can have a geometry which corresponds to the geometry of the cross-section of the optical waveguide. In an unmounted state, an internal diameter of the optical waveguide receptacle is smaller than a diameter of the optical waveguide. In other words again, the cross-sectional surface of the optical waveguide can be larger than an inner surface which is enclosed by the optical waveguide receptacle of the carrier in an unmounted state. By shrink fitting the carrier onto the optical waveguide, a surface pressure is embodied by the carrier which embodies a force-fit connection between the carrier and the optical waveguide and fixes the carrier and the optical waveguide axially and radially against one another.

According to another aspect, the optical waveguide receptacle of the carrier can be embodied as an adhesive surface, which is provided and embodied to fix the optical waveguide in the carrier by means of an exclusive material-bonded connection.

In other words, the optical waveguide receptacle of the carrier can have a geometry which corresponds to the geometry of the cross-section of the optical waveguide. An internal diameter of the optical waveguide receptacle is marginally larger than a diameter of the optical waveguide in an unmounted state. The intermediate space which is embodied between the optical waveguide receptacle of the carrier and the optical waveguide is filled with an adhesive which connects the carrier and the optical waveguide in a material-bonded manner. By gluing the optical waveguide into the carrier on the optical waveguide, a material-bonded connection is embodied between the carrier and the optical waveguide and fixes the carrier and the optical waveguide axially and radially against one another.

According to a further aspect, the optical waveguide is fixed in the optical waveguide receptacle of the carrier exclusively in a material-bonded manner by means of in-mold injection molding or assembly injection molding.

In other words, the carrier made from plastic can be molded directly on/to the outer surface of the optical waveguide. For this purpose, the optical waveguide is placed into the injection mold of the carrier and the carrier is then embodied in one piece with the optical waveguide. By embodying the carrier directly on the optical waveguide, work steps or assembly steps can be reduced.

According to a further aspect, the surface of the outer surface of the optical waveguide in a contact section of the optical waveguide can have an increased surface roughness/an increased coefficient of roughness, compared with the remaining outer surface of the optical waveguide.

In other words, the surface of the optical waveguide can be roughened in a section with which the carrier makes contact with or holds the optical waveguide, compared with other sections of the carrier, preferably by means of grinding, brushing, etching and/or sandblasting. On account of the increased surface roughness, the friction and thus the force which can be transmitted in the case of a force-fit connection can be increased between the carrier and the optical waveguide.

According to a further aspect, the carrier can be embodied in one piece. In other words, the carrier can be an individual component, which is preferably manufactured by means of rotation, in the injection molding method, by means of stamping or suchlike. The carrier is preferably embodied integrally. The single-piece embodiment facilitates the assembly and reduces assembly steps. In addition, the risk of any weak points which may occur when several components are joined is minimized.

According to a further aspect, an external geometry of the carrier facing radially away from the optical waveguide is provided and embodied to fix the optical waveguide device in a lighting device of the household appliance or to a housing or a further holder. In other words, the carrier can have an external geometry, with which the optical waveguide can be fastened in/on the lighting device. The geometry of the external geometry is preferably adjusted here to the geometry of a receptacle of the lighting device, which is provided and embodied to receive the optical waveguide device.

According to a first embodiment, an optical waveguide device is provided, which can guide light emitted from a light source into an interior space of a household appliance, in particular into a cooking chamber of a cooking appliance and has a (glass) optical waveguide, which is provided and embodied to emit the light, which is introduced into the optical waveguide at a first end of the optical waveguide, to a second end of the optical waveguide, and has a carrier in order to fix the optical waveguide axially and radially, wherein the optical waveguide has a constant cross-section between the first end and the second end and the carrier, as a clamping disk, is embodied with a plurality of radially elastically pretensioned clamping sections, in particular clamping lugs, which hold the optical waveguide exclusively in a force-fit manner.

According to a second embodiment, an optical waveguide device is provided, which can guide light emitted from a light source into an interior space of a household appliance, in particular into a cooking chamber of a cooking appliance and has a (glass) optical waveguide which is provided and embodied to emit the light, which is introduced into the optical waveguide at a first end of the optical waveguide, to a second end of the optical waveguide and has a carrier in order to fix the optical waveguide axially and radially, wherein the optical waveguide has a constant cross-section between the first end and the second end and the carrier is embodied and adjusted to the cross-section of the optical waveguide in order to hold the optical waveguide between the carrier and the optical waveguide exclusively in a force-fit manner by means of a thermal press fit. In other words, the carrier is shrunk onto the optical waveguide, so that a force-fit connection exists between the carrier and the optical waveguide and the carrier and the optical waveguide are fixed radially and axially with respect to one another.

According to a third embodiment, an optical waveguide device is provided, which can guide light emitted from a light source into an interior space of a household appliance, in particular into a cooking chamber of a cooking appliance and has a (glass) optical waveguide which is provided and embodied to emit the light, which is introduced into the optical waveguide at a first end of the optical wave guide, to a second end of the optical waveguide and a carrier in order to fix the optical waveguide axially and radially, wherein the optical waveguide has a constant cross-section between the first end and the second end and the carrier is embodied and adjusted to the cross-section of the optical waveguide in order to fix the optical waveguide exclusively in a material-bonded manner, in particular by means of an adhesive connection, in the carrier. The carrier and the optical waveguide are fixed axially and radially with respect to one another by means of adhesive, which connects the carrier and the optical waveguide in a material-bonded manner by way of the contact surface.

According to a fourth embodiment, an optical waveguide device is provided, which can guide light emitted from a light source into an interior space of a household appliance, in particular into a cooking chamber of a cooking appliance and has a (glass) optical waveguide which is provided and embodied to emit the light, which is introduced into the optical waveguide at a first end of the optical wave guide, to a second end of the optical waveguide and has a carrier in order to fix the optical waveguide axially and radially, wherein the optical waveguide has a constant cross-section between the first end and the second end and the carrier is injection molded onto the optical waveguide in the injection molding method, in particular in the in-mold method. In other words, the carrier is embodied on the optical waveguide by means of injection molding (in-mold method). The carrier and the optical waveguide are connected here in a material-bonded manner and are also fixed axially and radially with respect to one another.

According to one aspect, a lighting device of a household appliance is provided, which has an illuminant arranged outside of an interior space of the household appliance, in particular cooking chamber of the cooking appliance and an optical waveguide device according to one of the preceding aspects. The optical waveguide device is provided to fix the optical waveguide, which guides the light emitted from the illuminant into the interior space of the household appliance, in the lighting device. The illuminant, in particular in the form of an LED, is preferably accommodated with a printed circuit board in the lighting device and emits the light into the first end of the optical waveguide, which in an assembled state is preferably located outside of the cooking chamber. The optical waveguide guides the light and at its second end, which in the assembled state is preferably located within the cooking compartment, outputs to the environment, in particular to the cooking chamber.

DETAILED DESCRIPTION OF EXEMPLARY EMBODIMENTS

Exemplary embodiments of the present disclosure are described below on the basis of the associated figures.

First Exemplary Embodiment

Figure 1:
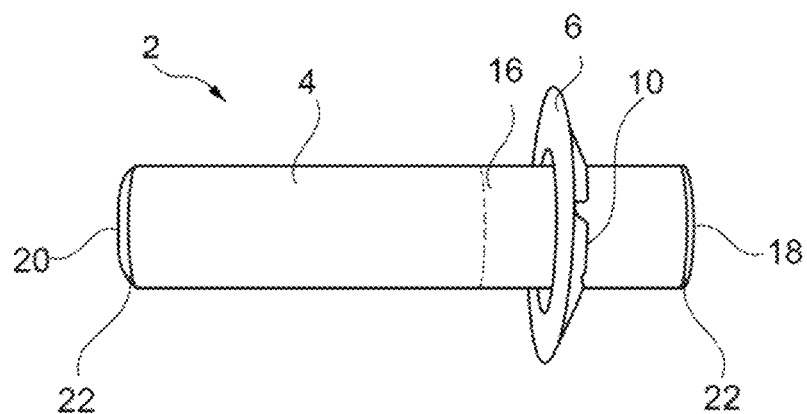
FIG. 1 is a representation of a carrier according to a first embodiment.

FIG. 1 shows a side view of an inventive optical waveguide device 2 according to a first embodiment. The optical waveguide device 2 has an optical waveguide 4 and a carrier 6. The carrier 6 bears the optical waveguide 4 on one hand and is coupled or can be coupled to a household appliance (not shown) on the other, in order to be able to fix the optical waveguide 4 directly or indirectly on or in the household appliance by way of the carrier 6.

Figure 2:
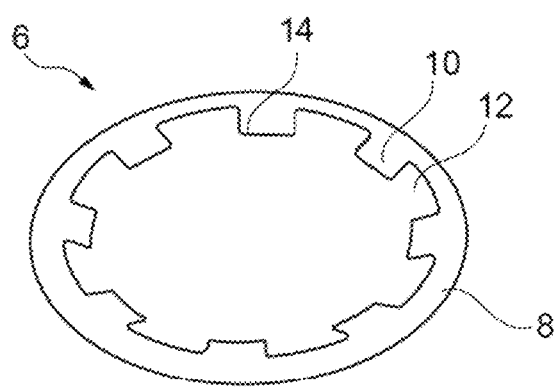
FIG. 2 is a representation of a radial view of a carrier mounted on an optical waveguide according to the first embodiment.

FIG. 2 only shows the carrier 6, which is embodied as a clamping disk/serrated ring. The carrier or the clamping disk 6 is preferably embodied in a ring-shaped/circle-shaped manner and has a ring or a ring-shaped support 8, which is provided and embodied to fix the optical waveguide device 2 to a lighting device of the household appliance. The clamping disk 6 is provided toward the ring center with an optical waveguide receptacle, wherein the optical waveguide receptacle is embodied as clamping lugs/disk lugs 10 arranged peripherally on the ring interior of the clamping disk 6 with clearances 12 arranged therebetween, said clearances being connected (in one piece) with an inner periphery of the ring-shaped support 8. The clamping lugs 10 are distributed uniformly over the inner periphery of the clamping disk 6 and connected elastically with the ring-shaped support 8. The clamping lugs 10 extend from the inner periphery of the clamping disk 6 in the direction of a point of orientation lying on a central axis of the clamping disk 6. The central axis runs through the projected center point of the clamping disk 6. Furthermore, the central axis is oriented/arranged perpendicular to the round clamping disk 6. The clamping lugs 10 are preferably arranged at an angle to the clamping disk 6. In other words, the projected center point of the clamping disk 6 and the point of orientation are at a distance from one another.

The optical waveguide 4 is produced in a rod shape and made from glass. It has a constant cross-section across its axial extent or it is (circular)-cylindrical. The optical waveguide 4 can guide light in the axial direction. As can be seen in FIG. 1, the clamping lugs 10 of the clamping disk 6 rest with a lug edge 14 facing away from the ring-shaped support 8 against the optical waveguide 4. In other words, the lug edge 14 is oriented toward the projected center point of the clamping disk 6. The internal diameter of the clamping lugs 10 or the diameter of the lug edges 14 is smaller than the diameter of the optical waveguide 4, as a result of which the clamping lugs 10 rest in an elastically pretensioned manner at an acute angle on an outer surface of the optical waveguide 4. The outer surface of the optical waveguide 4 is preferably provided in a clamping section 16 with an increased surface roughness compared to at another point. A pretension force and a coefficient of friction between the lug edge 14 and the outer surface in the clamping section 16 of the optical waveguide 4 provide for a force-fit connection between the optical waveguide 4 and the clamping disk 6. This force-fit connection ensures that the clamping disk 6 and the optical waveguide 4 are fixed against one another in the axial and radial direction. The optical waveguide 4 is provided with a mounting fiber 22 at a first end/at a first end surface 18 and at a second end/at a second end surface 20.

Figure 3:
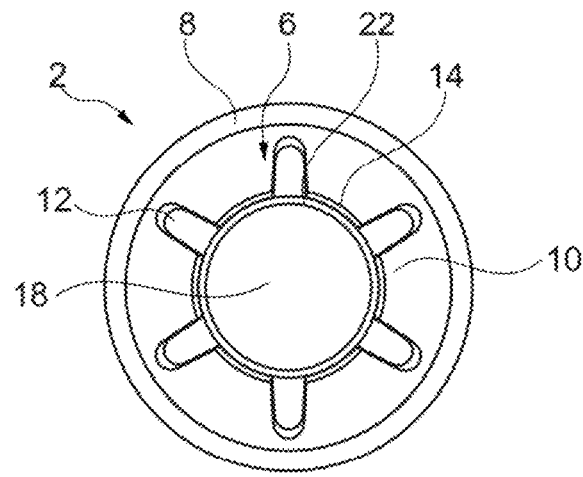
FIG. 3 is a representation of an axial view of the carrier mounted on the optical waveguide according to the first embodiment.

FIG. 3 shows an axial view of the inventive optical waveguide device 2 of the first embodiment. The clamping lugs 10 rest with the lug edges 14 oriented toward the center of the preferably round clamping disk 6 against the optical waveguide 4. The lug edge 14 preferably has a roundness, which corresponds to the roundness of the outer surface of the optical waveguide 4, so that the lug edge 14 rests completely against the outer surface of the optical waveguide. The individual clamping lugs 10 are distanced from one another in the peripheral direction by means of the clearances 12. The ring-shaped support 8 of the clamping disk 6 is provided on the side of the clamping disk 6 facing radially away from the optical waveguide 4. In an assembled state, the ring-shaped support 8 is preferably oriented parallel to the first end surface 18 and the second end surface 20 or in a plane at a right angle to the axis of the optical waveguide 4.

Second Exemplary Embodiment

Figure 4:
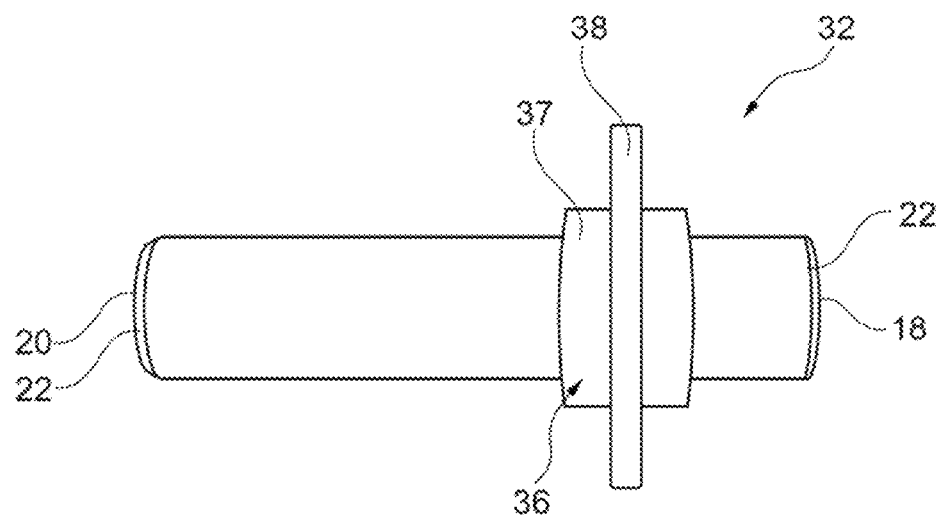
FIG. 4 is a representation of a radial view of the carrier mounted on the optical waveguide according to a second embodiment.

FIG. 4 shows a side view of an inventive optical waveguide device 32 according to a second embodiment. The second embodiment differs from the first embodiment only in the carrier, i.e. the optical waveguide 4 of the second embodiment being identical to the optical waveguide 4 of the first embodiment, which is why the description of the optical waveguide 4 is not repeated.

With the second embodiment, the carrier is embodied as a sleeve carrier 36. The sleeve carrier 36 contains a sleeve 37 and a flange 38, which is arranged centrally on the sleeve 37. The sleeve 37 is preferably provided and embodied to establish a force-fit connection between the sleeve carrier 36 and the optical waveguide 4. This force-fit connection between the sleeve carrier 36 and the optical waveguide 4 is achieved by means of a thermal press fit. In this regard, in an unmounted state the internal diameter of the sleeve 37 is smaller than the external diameter of the optical waveguide 4. The force-fit connection ensures that the sleeve carrier 36 and the optical waveguide 4 are fixed in an axial and radial direction against one another. The flange 38 is provided on the side of the sleeve carrier 36 facing radially away from the optical waveguide 4. The diameter of the flange 38 is preferably larger than the diameter of the sleeve 37. Moreover, the axial extent of the sleeve 37 is preferably larger than the axial extent of the flange 38. The flange 38 is preferably oriented parallel to the first end surface 18 and the second end surface 20. The sleeve carrier 36 is manufactured from metal, for instance.

Figure 5:
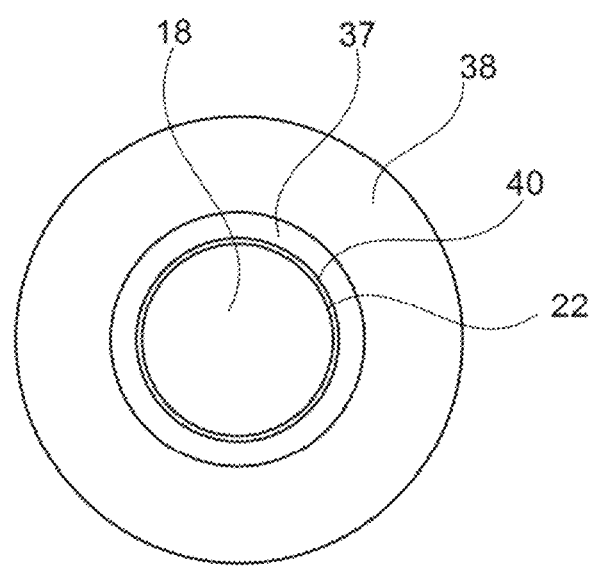
FIG. 5 is a representation of an axial view of the carrier mounted on the optical waveguide according to the second embodiment.

FIG. 5 shows an axial view of the inventive optical waveguide device 32 of the second embodiment. An inner sleeve surface 40 of the sleeve carrier 36 rests against the outer surface of the optical waveguide 4. In other words, the inner sleeve surface 40 of the sleeve carrier 36 makes contact with the optical waveguide 4 over the entire axial length of the sleeve 37. The sleeve carrier 36 is embodied in one piece, but can also be embodied in multiple parts.

MODIFIED EXEMPLARY EMBODIMENTS

According to a modified embodiment, the sleeve carrier 36 and the optical waveguide 4 can be connected by means of an adhesive connection. In this regard, an adhesive is applied to the inner sleeve surface 40 of the sleeve 37 and the sleeve 37 is then slid onto the optical waveguide 4. In an unmounted state the internal diameter of the sleeve 37 is larger than the external diameter of the optical waveguide. After curing the adhesive, the sleeve carrier 36 and the optical waveguide 4 are connected in a material-bonded manner. The material-bonded connection ensures that the sleeve carrier 36 and the optical waveguide 4 are fixed against one another in an axial and radial direction. For instance, the sleeve carrier 36 is manufactured from metal, a ceramic or a plastic.

According to a further modified embodiment, the sleeve carrier 36 and the optical waveguide 4 can be connected by means of an "In-mold" connection (assembly injection molding method). In this regard, the optical waveguide 4 is placed into an injection molding tool and the sleeve carrier 36 is molded in an injection molding method around the optical waveguide 4 in the injection molding tool. Here the optical waveguide 4 and the sleeve carrier 36 are connected to one another in a material-bonded manner. The material-bonded connection ensures that the sleeve carrier 36 and the optical waveguide 4 are fixed against one another in an axial and radial direction.

Figure 6:
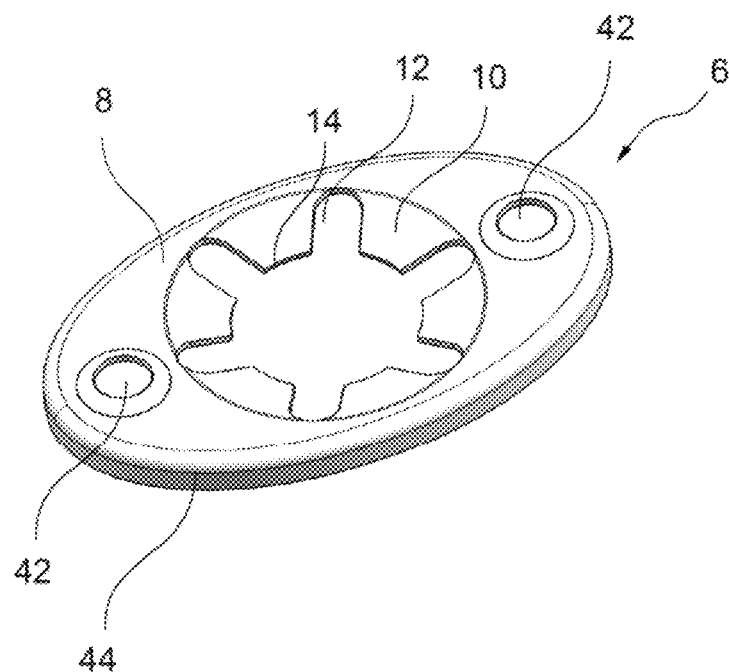
FIG. 6 is a representation of a modified embodiment of the carrier in a top view.
Figure 7:
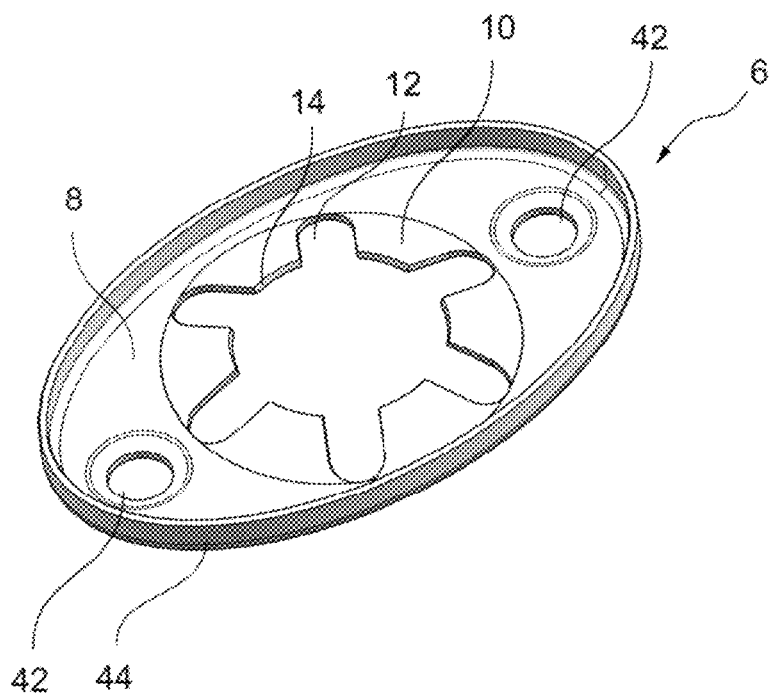
FIG. 7 is a representation of a modified embodiment of the carrier in a view from below.

FIG. 6 shows a modified embodiment of the carrier 6 from FIG. 2 in a top view and FIG. 7 shows the modified embodiment in a bottom view. Contrary to the embodiment shown in FIG. 2, the support 8 has an elliptical shape. Two screw holes 42 are embodied in the support 8, with which the carrier 6 can be fixed to the lighting device of the household appliance, for instance. Alternatively, the carrier 6 can also be screwed directly onto a household appliance wall. An outer edge 44 which extends away from the support 8 perpendicular to a planar extent of the support 8 is embodied on an outer periphery of the support 8.

LIST OF REFERENCE CHARACTERS

2 Optical waveguide device (first embodiment)
4 Optical waveguide
6 Carrier
8 Ring-shaped support
10 Clamping lug/disk lug
12 Clearance
14 Lug edge
16 Clamping section
18 First end surface
20 Second end surface
22 Mounting fiber
32 Optical waveguide device (second embodiment)
36 Sleeve carrier
37 Sleeve
38 Flange
40 Inner sleeve surface
42 Screw hole
44 Outer edge

The invention claimed is:

1. An optical waveguide device for guiding light emitted from a light source into an interior space of a household appliance, in particular a cooking chamber of a cooking appliance, the optical waveguide device comprising:
   an optical waveguide designed to emit light, introduced into the optical waveguide at a first end of the optical waveguide, to a second end of the optical waveguide, said optical waveguide having a cylindrical outer surface between the first end of the optical waveguide and the second end of the optical waveguide; and
   a carrier capable of being directly or indirectly coupled to the household appliance and comprising an optical waveguide receptacle designed to receive the optical waveguide and to fix the optical waveguide axially and radially, said carrier connected to the optical waveguide by way of the outer surface, with the optical waveguide receptacle contacting the outer surface of the optical waveguide over a periphery of the optical waveguide, wherein the optical waveguide receptacle of the carrier is embodied as a clamping lug elastically pretensioned toward the central axis of the optical waveguide receptacle and designed to fix the optical waveguide in the carrier exclusively by a force-fit connection.

2. The optical waveguide device of claim 1, wherein the optical waveguide is a glass optical waveguide.

3. The optical waveguide device of claim 1, wherein the outer surface has a circular cylindrical configuration.

4. The optical waveguide device of claim 1, wherein the optical waveguide receptacle of the carrier is embodied to be rotationally symmetrical.

5. The optical waveguide device of claim 1, wherein the optical waveguide receptacle uniformly contacts the outer surface of the optical waveguide over the periphery of the optical waveguide.

6. The optical waveguide device of claim 1, wherein the clamping lug rests at an acute angle against the outer surface of the optical waveguide.

7. The optical waveguide device of claim 1, wherein the clamping lug comprises a lug edge which is matched to an outer contour of the optical waveguide in terms of its geometry.

8. The optical waveguide device of claim 1, wherein the clamping lug pretensions the optical waveguide against a contact surface.

9. The optical waveguide device of claim 1, wherein the optical waveguide receptacle is embodied as a plurality of said clamping lug elastically pretensioned toward the central axis of the optical waveguide receptacle and designed to uniformly contact the optical waveguide over the periphery of the optical waveguide.

10. The optical waveguide device of claim 1, wherein the optical waveguide receptacle of the carrier is embodied as an adhesive surface so as to fix the optical waveguide in the carrier exclusively by a material-bonded connection.

11. The optical waveguide device of claim 1, wherein the optical waveguide is fixed in the optical waveguide receptacle of the carrier exclusively in a material-bonded manner by In-mold injection molding.

12. The optical waveguide device of claim 1, wherein the carrier is embodied to be rotationally symmetrical, in respect of the central axis fiber of the optical waveguide receptacle.

13. The optical waveguide device of claim 1, wherein the carrier is embodied in one piece.

14. The optical waveguide device of claim 1, wherein the carrier has an external geometry which faces away from the optical waveguide and is designed to fix the optical waveguide device in a lighting device of the household appliance.

15. An optical waveguide device for guiding light emitted from a light source into an interior space of a household appliance, in particular a cooking chamber of a cooking appliance, the optical waveguide device comprising:
   an optical waveguide designed to emit light, introduced into the optical waveguide at a first end of the optical waveguide, to a second end of the optical waveguide, said optical waveguide having a cylindrical outer surface between the first end of the optical waveguide and the second end of the optical waveguide; and
   a carrier capable of being directly or indirectly coupled to the household appliance and comprising an optical waveguide receptacle designed to receive the optical waveguide and to fix the optical waveguide axially and radially, said carrier connected to the optical waveguide by way of the outer surface, with the optical waveguide receptacle contacting the outer surface of the optical waveguide over a periphery of the optical waveguide, wherein the optical waveguide receptacle of the carrier and the optical waveguide are connected by a thermal press fit connection so as to fix the optical waveguide in the carrier exclusively by a force-fit connection.

16. The optical waveguide device of claim 15, wherein the carrier comprises a sleeve carrier including:

a sleeve; and a flange arranged centrally on the sleeve.

17. An optical waveguide device for guiding light emitted from a light source into an interior space of a household appliance, in particular a cooking chamber of a cooking appliance, the optical waveguide device comprising:

an optical waveguide designed to emit light, introduced into the optical waveguide at a first end of the optical waveguide, to a second end of the optical waveguide, said optical waveguide having a cylindrical outer surface between the first end of the optical waveguide and the second end of the optical waveguide; and a carrier capable of being directly or indirectly coupled to the household appliance and comprising an optical waveguide receptacle designed to receive the optical waveguide and to fix the optical waveguide axially and radially, said carrier connected to the optical waveguide by way of the outer surface, with the optical waveguide receptacle contacting the outer surface of the optical waveguide over a periphery of the optical waveguide, wherein the outer surface of the optical waveguide is designed increased surface roughness or an increased coefficient of roughness in a contact section of the optical waveguide, compared with a non-contact section of the optical waveguide.

\* \* \* \* \*